United States Patent [19]
Kamiyama et al.

[11] Patent Number: 6,043,940
[45] Date of Patent: Mar. 28, 2000

[54] OPTICAL SYSTEM FOR OPTICAL RECORDING

[75] Inventors: Kazushi Kamiyama, Uji; Shinji Inoue, Souraku-gun; Satoru Tsubokura, Gamo-gun; Hiroyuki Kinoshita, Yasu-gun; Takashi Uto, Youkaichi, all of Japan

[73] Assignee: Kyocera Corporation, Kyoto, Japan

[21] Appl. No.: 09/193,111

[22] Filed: Nov. 16, 1998

[30] Foreign Application Priority Data

| Nov. 14, 1997 | [JP] | Japan | 9-313772 |
| Apr. 28, 1998 | [JP] | Japan | 10-119766 |
| Jun. 29, 1998 | [JP] | Japan | 10-182058 |

[51] Int. Cl.[7] .................................................. G02B 3/02
[52] U.S. Cl. .......................................... 359/719; 359/245
[58] Field of Search ................................................ 359/719

[56] References Cited

U.S. PATENT DOCUMENTS 4,753,521  6/1988  Deserno ................................ 350/465
5,125,750  6/1992  Corle et al. .

FOREIGN PATENT DOCUMENTS 8212579  8/1996  Japan .
9725776  7/1997  WIPO .

*Primary Examiner*—Scott J. Sugarman
*Assistant Examiner*—Younggil Timothy Lee
*Attorney, Agent, or Firm*—Loeb & Loeb, LLP

[57] ABSTRACT

A hemispheric lens of a single crystal having a refractive index of 2.0 or over is used as a SIL lens of an optical system for optical recording. The single crystal is $LiNbO_3$, $LiTaO_3$, rutile phase $TiO_2$, $PbMoO_4$, $TeO_2$, $SrTiO_3$, $ZrO_2$, $SrNbO_3$, $SrTaO_3$, $CaNbO_3$, $CaTaO_3$, $CaTiO_3$, $KNbO_3$, $KTaO_3$, $BaZrO_3$, $SrZrO_3$, $CaZrO_3$, $KNbO_3$, $KTaO_3$, $BaZrO_3$, $SrZrO_3$, $CaZrO_3$, $ZnWO_4$, $ZnMoO_4$, $CdWO_4$, $CdMoO_4$, $PbWO_4$, $Bi20SiO12$, $Bi20GeO12$, $Bi4Si3O12$, $Bi4Ge3O12$, GaP, ZnTe, ZnSe, $Cu3TaSe4$ or ZnS.

5 Claims, 4 Drawing Sheets

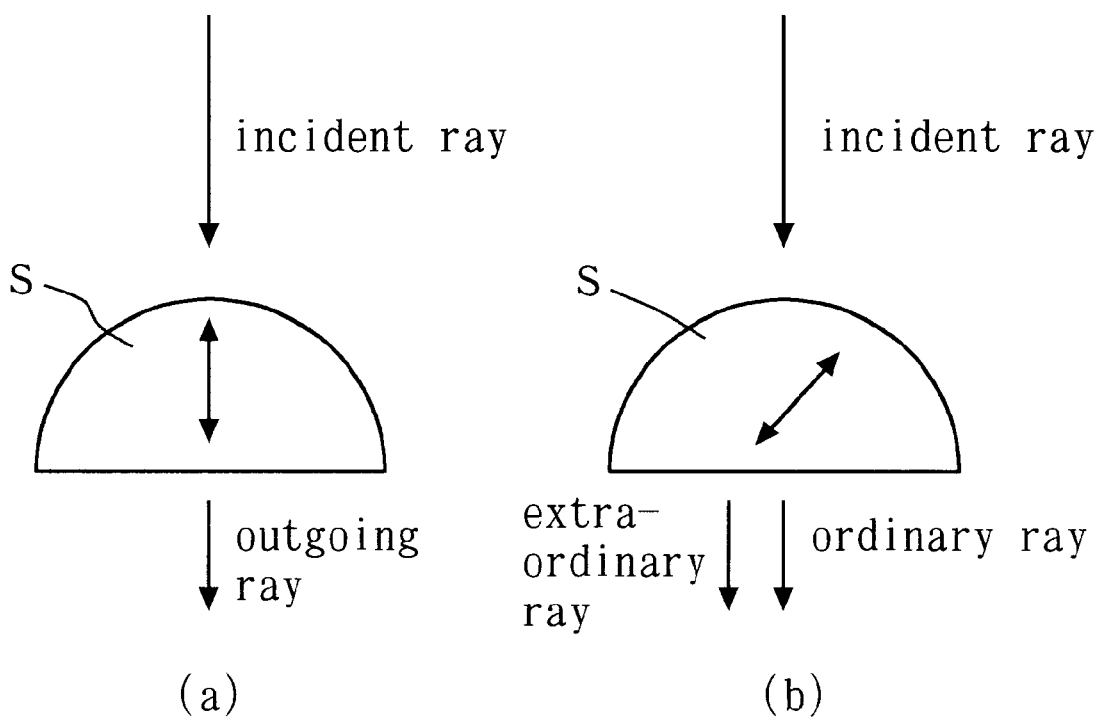

and DVD-RAM.
OPTICAL SYSTEM FOR OPTICAL RECORDING

FIELD OF THE INVENTION

The present invention relates to an optical system for optical recording, such as optical head, that uses a laser beam to write information in and read out information from an optical recording medium such as magneto-optical disc and DVD-RAM.

PRIOR ART

To raise the surface recording density of an optical recording medium such as magneto-optical disc and DVD-RAM, it is necessary to reduce the beam spot size of a laser beam for recording as low as possible. Generally speaking, the beam spot size of a laser beam is determined by the wavelength λ of a light source and the numerical aperture (NA) of an objective lens, and is approximated to be about 0.8×λ/NA. If a light wavelength of 635 nm, that is currently used in optical disc systems, and a lens with NA=0.6 are used, the laser beam spot size will be 847 nm. At present, development of a blue laser using a gallium nitride (GaN) material is under way. This semiconductor laser is expected to realize a laser beam of a shorter wavelength. If we use its wavelength of 410 nm and assume that the NA of a lens is improved to be 0.7, then the calculated beam spot size will be 469 nm. This, however, will merely raise the present surface recording density by about three times.

It has been proposed to use an optical system, in which a hemispheric lens called a solid immersion lens (SIL) is provided between an optical recording medium and an objective lens, to reduce the beam spot size of a beam that has passed the objective lens to 1/n (where n is the refractive index of the SIL) (for example, U.S. Pat. No. 5,125,750). The laser beam, that has passed the above-mentioned SIL and entered into the atmosphere, tends to expand to the original beam spot size. However, in an area where the distance between the recording side of the optical recording medium and the opposing bottom of the SIL is within about one fourth (¼) of the laser beam wavelength (near-field area), the laser beam is emitted with the same properties as the laser beam inside the SIL, and the beam spot size is reduced to 1/n of the diffraction limit. With the use of a SIL, if the SIL is a glass lens with refractive index of 1.8, the laser spot size will be reduced to 1/1.8 or nearly one half of the original size. Thus a recording density as high as about four times is obtained from the same laser wavelength. In this way, the recording density can be improved greatly.

Glasses such as borosilicate glass are normally used for SILs. The refractive index of a glass is normally 1.8 or under. To obtain a refractive index higher than that, it is necessary to use, for example, special glasses of which major components are oxides of rare-earth elements, for example, La2O3, Th2O3, ZrO2 and Ta2O5. The refractive indexes of these special glasses themselves are 2.0 or under, and high-density recording with glass materials has had limits.

In the near-field area, if a laser beam near 630 nm is used as a light source, the laser beam spot size is about 300 nm or under. Hence the face of the SIL opposing the recording side of an optical recording medium is required to be worked with high accuracy to have a high flatness, and the SIL is required to homogeneous in terms of refractive index. The conventional glasses, however, have had problems such as striae. Even if a polycrystal with a high refractive index is used for a SIL, the transmittance of light will be reduced by many grain boundaries that are present in the polycrystal (for example, the transmittance is 50% or under for light wavelength of 500~600 nm). Thus an optical head with excellent performance can not be provided.

SUMMARY OF THE INVENTION

One object of the present invention is to provide an optical lens that eliminates the above-mentioned variety of problems, has a high refractive index and an excellent transmittance and can be easily produced, and an optical system for optical recording using the optical lens.

The optical system for optical recording according to the present invention is an optical system for optical recording having, at least, a condenser lens for irradiating a laser beam on an optical recording medium, for example, an optical system for optical recording, such as optical head, comprising an objective lens to reduce, to a required beam spot size, a laser beam being irradiated on an optical recording medium, and the condenser lens to condense the laser beam having passed the objective lens and irradiate it to said optical recording medium, and said condenser lens is made of a single crystal being a member of a group of LiNbO3, LiTaO3, rutile phase TiO2, PbMoO4, TeO2, SrTiO3, ZrO2, SrNbO3, SrTaO3, CaNbO3, CaTaO3, CaTiO3, KNbO3, KTaO3, K(Ta, Nb)O3, BaZrO3, SrZrO3, CaZrO3, ZnWO4, ZnMoO4, CdWO4, CdMoO4, PbWO4, Bi20SiO12, Bi20GeO12, Bi4Si3O12, Bi4Ge3O12, GaP, ZnTe, ZnSe, Cu3TaSe4 and ZnS.

The above-mentioned single crystal materials have high refractive indexes (2.0 or over), are suitable for mass production, and can be used for SILs very favorably.

A condenser lens being made of a single crystal of LiNbO3 contains 3~7 mol % of magnesia, and more favorably 4~5 mol %. If magnesia is 3~7 mol %, as the optical damage resistance of the lens is high, its index change is small, moreover, as its crystallinity is high, the refractive index distribution (variance) is very small, and single crystals that are grown have few cracks and have a good crystallinity.

An optical system for an optical recording according to the present invention is an optical system for the optical recording having, at least, a condenser lens to irradiate a laser beam to record information on an optical recording medium, and said condenser lens is made of a single crystal that has a refractive index of 2.0 or over, and more preferably, a refractive index ranging from 2.1 to 3.7, and optical anisotropy.

Preferably, the axis of incident beam and the crystallographic optic axis of the single crystal are set at an angle of about 0°, for example, 0°±1° or at an angle of about 45°, for example, 45°±3° or 45°±1°.

FIGS. 7(a) and (b) schematically show a case in which the crystallographic optic axis of a single crystal S and the direction of an incident beam coincide with each other and a case in which they are set at a certain angle. When the crystallographic optic axis of the single crystal S substantially coincides with the direction of an incident beam, if the single crystal S has optical anisotropy, one outgoing ray will be produced. When they are set at about 45°, an extraordinary ray and an ordinary ray will be emitted. The output difference between these two rays can be used to read the stored information. Thus the single crystal S can play a role similar to that of Wollaston prism in a conventional recording and reading system.

In the optical system for the optical recording according to the present invention, a condenser lens is made of a single crystal selected from a group of highly homogeneous single crystals with few defects, comprising LiNbO3, LiTaO3, rutile phase TiO2, PbMoO4, TeO2, SrTiO3, ZrO2, SrNbO3, SrTaO3, CaNbO3, CaTaO3, CaTiO3, KNbO3, KTaO3, K(Ta, Nb)O3, BaZrO3, SrZrO3, CaZrO3, ZnWO4, ZnMoO4, CdWO4, CdMoO4, PbWO4, Bi2OSiO12, Bi20GeO12, Bi4Si3O12, Bi4Ge3O12, GaP, ZnTe, ZnSe, Cu3TaSe4 and ZnS. Each of these single crystals can be worked into a condenser lens that has an excellent transmittance to a wavelength of a laser in use and a good workability and can be easily produced, and in turn, can provide an excellent optical system for optical recording. The refractive indexes of the above-mentioned single crystals are 2.0 or over, thus condenser lenses of these single crystals can greatly reduce the beam spot size of a laser beam with high accuracy. As the recording pit size can be reduced significantly, recording with a density as high as several times of the present level can be made on an optical recording medium.

When a single crystal of LiNbO3 containing 3~7 mol % of magnesia or more preferably, 4~5 mol % of magnesia, is used to produce a condenser lens, as the crystal has high optical damage resistance, the index change of the condenser lens will be small, and as the crystal has high crystallinity, the refractive index distribution (variance) of the condenser lens will be very small, and, in turn, an optical system for optical recording having an excellent condenser lens can be provided. The above-mentioned optical system for optical recording will do provided it can, at least, record information on an optical recording medium.

BRIEF DESCRIPTION OF THE DRAWINGS

FIGS. 7(a) and (b) are diagrams showing the relationship between the incident ray direction and the outgoing ray direction.

FIG. 7(a) shows a case wherein the incident ray direction and the crystallographic optic axis coincide with each other.

FIG. 7(b) shows a case wherein the crystallographic optic axis and the incident ray direction do not coincide with each other.

EMBODIMENTS

Figure 1:
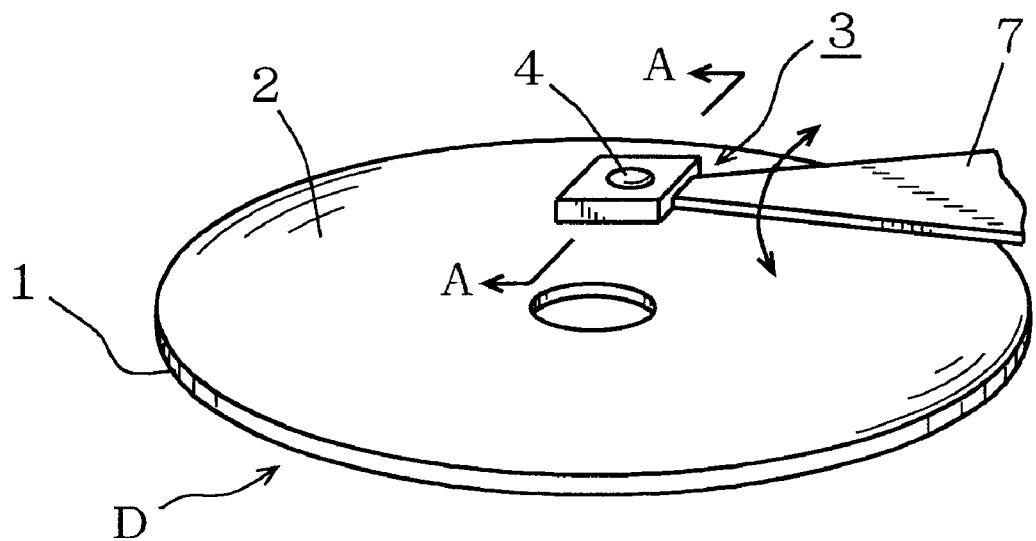
FIG. 1 is a perspective view schematically showing an embodiment of the present invention.
Figure 2:
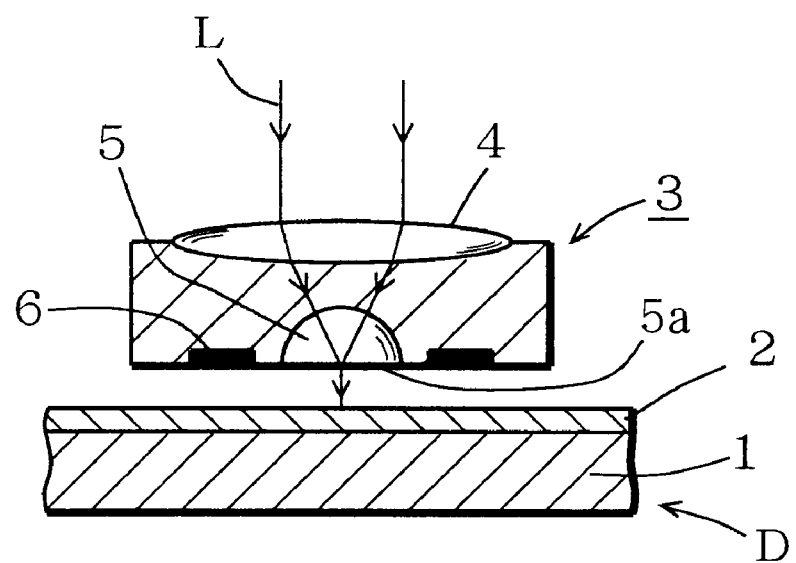
FIG. 2 is a partial enlarged sectional view along the line A—A of FIG. 1.

Optical recording on an optical recording medium is shown in FIG. 1. A partial section along the line A—A of FIG. 1 is shown in FIG. 2. On a substrate 1 of a resin such as polycarbonate, a glass, etc., a recording layer 2 is provided to form an optical magnetic disc D. The recording layer 2 includes a dielectric layer of, for example, silicon nitride, a magnetic layer of, for example, Gd—Fe—Co alloy or Tb—Fe—Co alloy, a dielectric layer of, for example, silicon nitride, a metal layer of, for example, aluminium, and a protective layer of, for example, UV resin. A laser beam L having a wavelength of 500 nm~700 nm is condensed by an optical head being an optical system for optical recording and a resulting beam having a specified beam spot size is irradiated on the optical magnetic disc D. As a result, information is recorded on the magnetic layer, being in the recording layer 2 of the optical magnetic disc D, within an area that was irradiated by the beam spot. The optical head 3 is supported by a movable arm 7 being connected to a controller that is not illustrated.

Recording of information on the optical magnetic disc D by the optical head 3 is made in the following manner. First, the laser beam L is converged by an objective lens 4 being a biconvex lens, then the beam L is reduced to a specified beam spot size by a SIL 5. The SIL 5 is a hemispheric condenser lens that is made of, for example, a single crystal such as strontium niobate or borosilicate glass, and has, in the bottom 5a, a flat portion for focusing. The recording layer 2 within the beam spot irradiated on the optical magnetic disc D is heated, and recording is made by magnetizing the magnetic layer by means of a magnetic field generated by a magnetic modulated coil 6 while the heated area cools down. The objective lens 4 may be a plano-convex lens.

Figure 3:
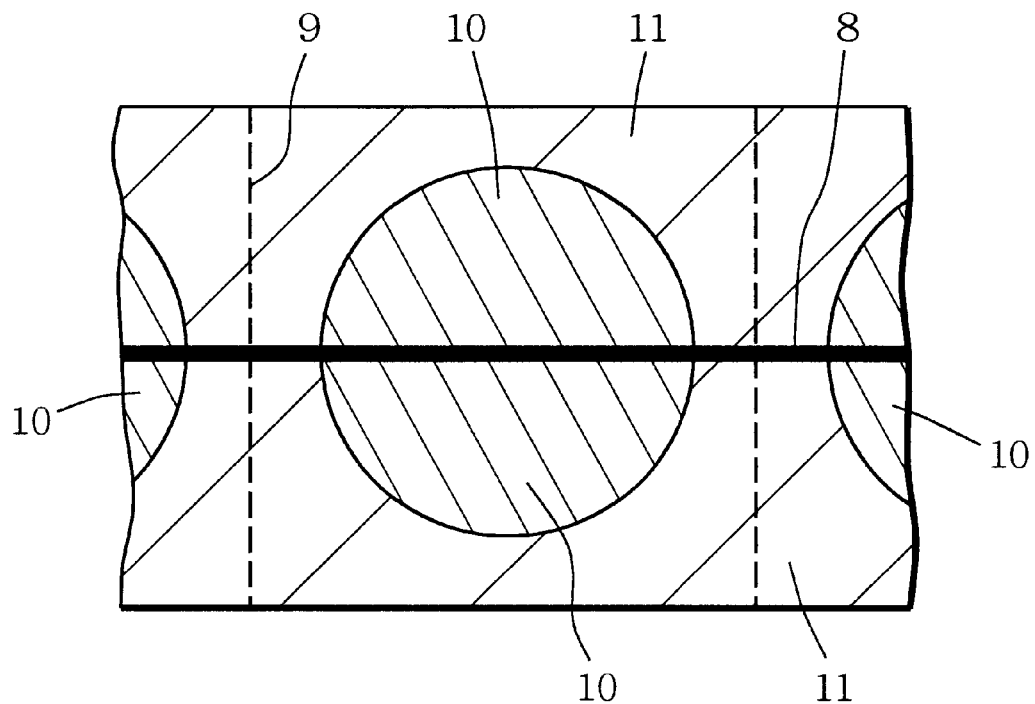
FIG. 3 is a diagram showing an example of production of a hemispheric lens of the embodiment.

The SIL 5 is produced by the following steps. As shown in FIG. 3, two substrates for SIL 11, 11, each having at least one optically-polished face, are bonded together by bonding their optically-polished faces with an adhesive such as wax. The substrates 11, 11 being bonded by an adhesive layer 8 are cut by a dicing saw, etc. along cutting planes 9 to get many cubes of the same dimension (thickness) as the bonded substrates 11, 11. The cubes thus obtained are worked into spheres by a conventional method to produce spherical lenses comprising hemispheres having a flat part and a spherical part. Next, spherical lenses are immersed in a wax removing solution to separate the bonded faces to get hemispheric condenser lenses 10, 10. In this case, the number of hemispheric lenses obtained is about twice the number of cubes cut out.

Figure 4:
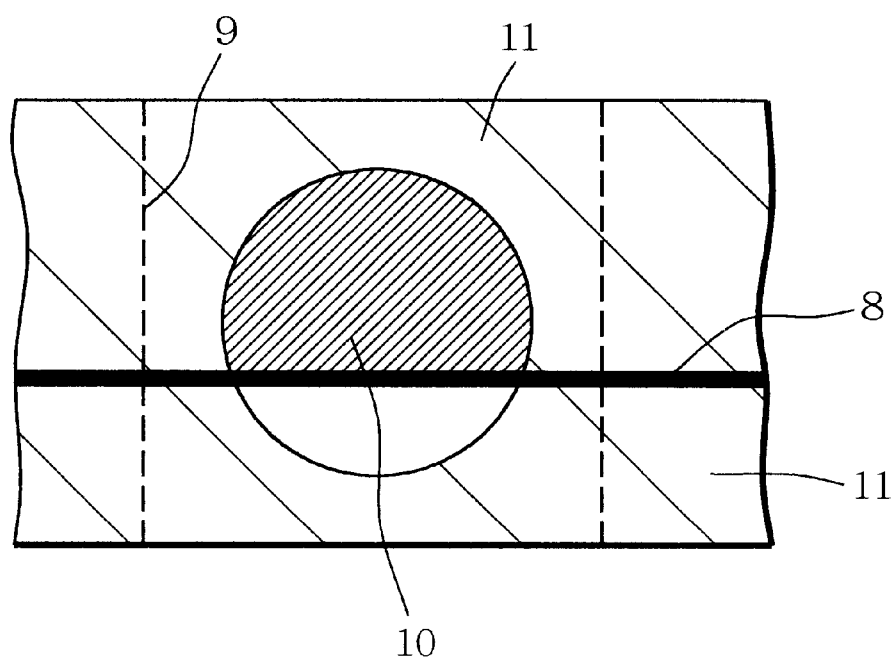
FIG. 4 is a diagram showing another example of production of a hemispheric lens of the embodiment.
Figure 5:
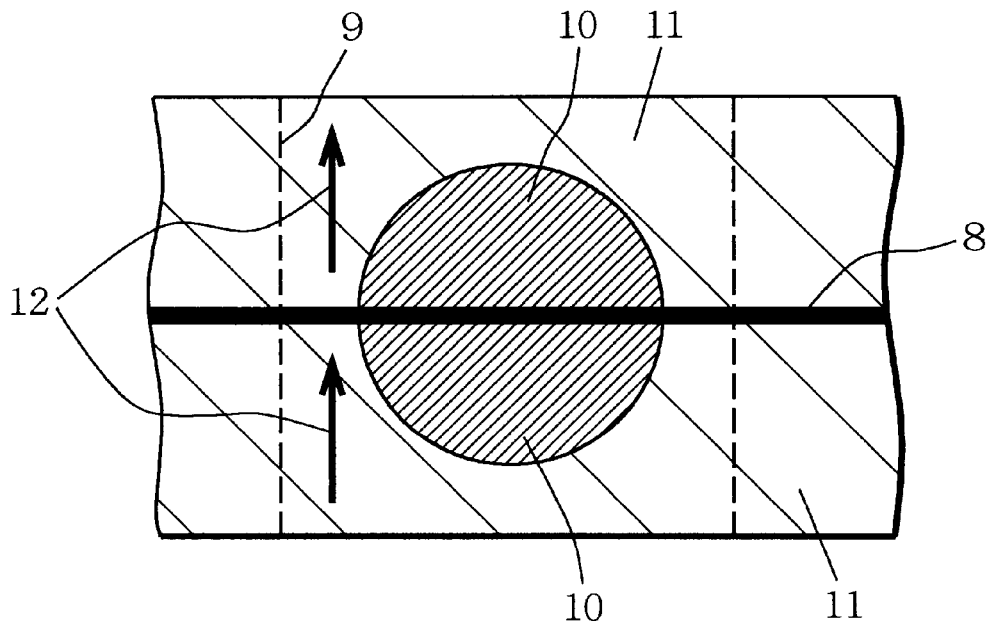
FIG. 5 is a diagram showing production of a hemispheric lens from substrates with a fixed orientation.

As shown in FIG. 4, two substrates for lens 11, 11 differing in thickness from each other may be bonded together to produce a superhemispheric condenser lense 10 of which flat part is away from the center of the sphere. As shown in FIG. 5, two substrates for lens 11, 11 of which crystallographic optic axes 12, 12 are aligned with each other may be bonded to produce a (super-) hemispheric condenser lens 10.

Figure 6:
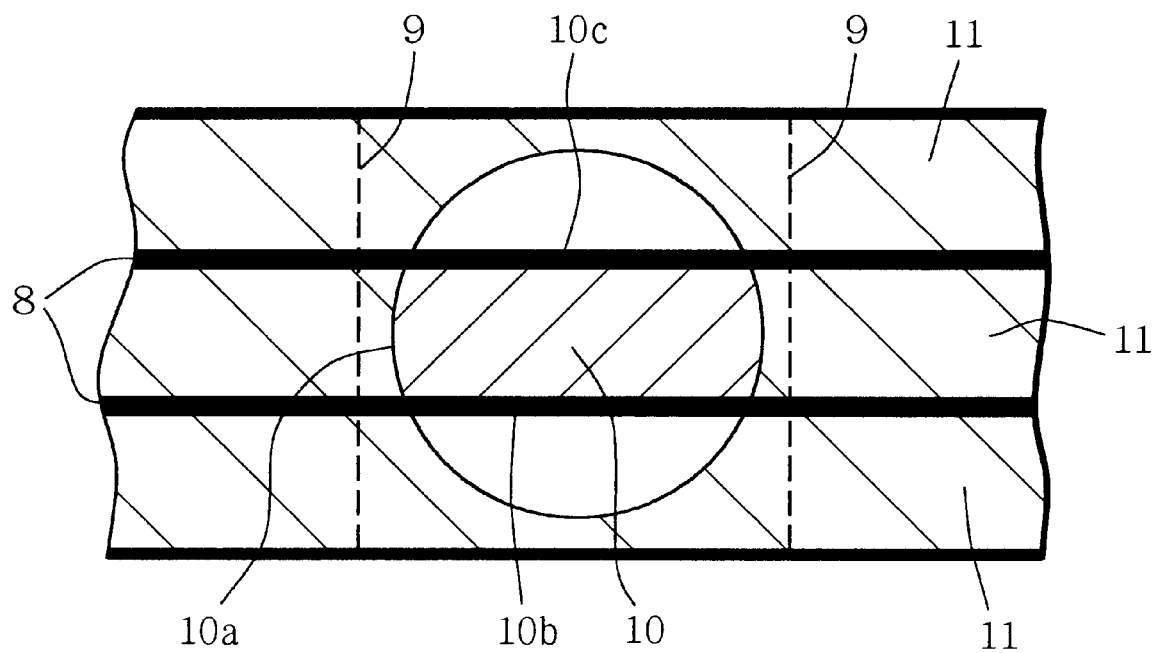
FIG. 6 is a diagram showing production of a lens of a modification.

As shown in FIG. 6, three or more substrates for lens 11 may be bonded together to produce, for example, a flat condenser lens 10 having a spherical part 10a and flat parts 10b, 10c. As such a condenser lens 10 can provide a smaller (lower) lens or can be formed to have a reference plane, it may be used as, for example, a lens for optical coupling system module that is applicable to optical couplers of optical modulators, optical switches, etc., and a lens for optical axis control and processes of optical systems.

The SIL 5 is made of any single crystal of LiNbO3 (trigonal; melting point: 1250° C.; refractive index: 2.29), LiTaO3 (trigonal; melting point: 1450° C.; refractive index: 2.18), rutile phase TiO2 (tetragonal; melting point: 1980° C.; refractive index: 2.61), PbMoO4 (tetragonal; melting point: 1070° C.; refractive index 2.39), TeO2 (tetragonal; melting point: 733° C.; refractive index 2.43), SrTiO3 (cubic; melting point: 2080° C.; refractive index: 2.41), ZrO2 (cubic; melting point: 2690° C.; refractive index: 2.42), SrNbO3 (cubic; refractive index: 2.22), SrTaO3 (cubic; refractive index: 2.2), CaNbO3 (cubic; refractive index: 2.15), CaTaO3 (cubic; refractive index: 2.1), CaTiO3 (cubic;

refractive index: 2.17), KNbO3 (orthorhombic; refractive index: 2.39), KTaO3 (orthorhombic; refractive index: 2.25), K(Ta, Nb)O3 (tetragonal; refractive index: 2.29), BaZrO3 (cubic; refractive index: 2.2), SrZrO3 (cubic; refractive index: 2.2), CaZrO3 (cubic; refractive index: 2.2), ZnWO4 (tetragonal; refractive index: 2.3), ZnMoO4 (tetragonal; refractive index: 2.3), CdWO4 (tetragonal; refractive index: 2.3), CdMoO4 (tetragonal; refractive index: 2.3), PbWO4 (tetragonal; refractive index: 2.3), PbMoO4 (tetragonal; refractive index: 2.3), Bi2OSiO12 (cubic; refractive index: 2.1), Bi2OGeO12 (cubic; refractive index: 2.1), Bi4Si3O12 (cubic; refractive index: 2.06), Bi4Ge3O12 (cubic; refractive index: 2.1), Gap (cubic; refractive index: 3.3), ZnTe (cubic; refractive index: 3.0), ZnSe (cubic; refractive index: 2.8), Cu3TaSe4 cubic; refractive index: 2.8) and ZnS (cubic; refractive index: 2.4).

Of these single crystals, LiNbO3, LiTaO3, rutile phase TiO2, PbMoO4, SrTiO3, ZrO2, SrNbO3, SrTaO3, Bi2OSiO12, Bi2OGeO12, Bi4Si3O12, Bi4Ge3O12, and GaP are favorable because they have particularly high refractive indexes, are available as large single crystals for industrial use, and are suitable for production by Czochralski (CZ) method allowing mass production. In particular, cubic crystals are optically equivalent and can be easily worked into lens without determining a specific orientation. These condenser lenses, for example, hemispheric lenses can be set in a specific orientation by giving the reference planes with a necessary orientation.

The refractive indexes of the above-mentioned single crystals are within a range of from 2.1 to 3.7, and their transmittances are 70% or over when the laser beam wavelength in use is 500~700 nm. All of these single crystals can be grown by some growth methods for mass production, such as Verneuil method and CZ method. As they are single crystals, they are homogeneous and ideal as optical materials, and moreover, as they are free of index change (optical damage) due to laser beams of shorter wavelength such as blue green beam, they can be favorably used as condenser lenses. Of these single crystals, isotropic ones such as cubic crystals are favorable because the refractive index is the same irrespective of the orientation of cutting of the single crystal.

Hence the materials of which refractive indexes are markedly greater than those of glasses and of which index changes are smaller than those of glasses can be used favorably to produce SILs, and in turn, the beam spot size of a laser beam can be reduced greatly. Moreover, the current recording pit size can be reduced significantly, allowing recording of information on an optical recording medium at a density as high as several times of the present level. Due to high mass-producibility and cost reduction, excellent SILs can be produced.

As shown in FIG. 1 and FIG. 2, the optical system for optical recording has been described by taking an example of the optical head 3 in which the objective lens 4, the condenser lens 5, etc. are provided integrally to record information. The configuration of the optical system is not limited to this. An optical head with a condenser lens only, having no objective lens, will do. An optical head that can both record and reproduce will do, and an optical head that can either record or reproduce will do. The optical head of the present invention can be used not only for magneto-optical discs but also for, for example, DVD-RAM that is a phase transition type optical disc having an optical recording layer of various Te alloys. The configuration of the condenser lens may be modified to an extent that it does not deviate from the gist of the present invention, and provided that a desired spot size is obtained. The present invention is also applicable in fields where (super-)hemispheric microlenses are used to converge a laser beam, such as the optical communication field.

Embodiment 1

Two substrates of 3 inch in diameter and 1 mm in thickness were cut out with a fixed orientation from a 3-inch LiTaO3 single crystal produced by Czochralski method. Both faces were optically-polished and the substrates were bonded together with a wax of low viscosity. Next, a 2 mm cube was cut out of the substrates, and a spherical lens of 1 mm in diameter was produced by the conventional polishing process of a n optical ball lens. Next, this spherical lens was immersed in a wax removing solution and rinsed to produce hemispheric lenses of 1 mm in diameter.

As these hemispheric lenses were produced by the production process of optical ball lens, the working accuracy was equal to that of the spherical lens. The direction of the incident laser beam was controlled within 0.1 degree from the optic axis so as to minimize the effects of double refraction. As a result, a condenser lens mainly for ordinary ray was produced. An outgoing ray of a semiconductor laser of 635 nm in wavelength is condensed by an objective lens of an optical head like one shown in FIG. 1, and the ray is focused further by a SIL being the hemispheric lens produced as described above. In this way, information can be recorded on and reproduced from an optical magnetic disc.

LiTaO3 has a refractive index of 2.18 which is greater than those of glasses, and can reduce the laser spot size on a recording medium. This, in turn, improves the recording density. In the present embodiment, the incident ray direction is aligned with the direction of the optic axis. However, the direction of the incident ray may be modified appropriately in relation to the crystallographic optic axis to converge the ray onto two points through the effect of double refraction.

Here, in addition to LiTaO3: melting point: 1450° C.; refractive index for ordinary ray no=2.18; refractive index for extraordinary ray ne=2.17; the SIL 5 is made of any single crystal selected from LiNbO3: melting point: 1250° C.; no=2.29; ne=2.20; rutile phase TiO2: melting point: 1980° C.; no=2.61; ne=2.90; PbMoO4: melting point: 1070° C.; no=2.39; ne=2.26; TeO2: melting point: 733° C.; no=2.43; ne=2.27; SrTiO3: melting point: 2080° C.; refractive index: 2.41; and ZrO2: melting point: 2690° C.; refractive index: 2.42.

Each of these single crystals has a refractive index of 2.1 or over and has an excellent transmittance of 70% or over for laser beam wavelength of 500~700 nm. In particular, it is very easy to grow crystals of LiNbO3, LiTaO3 and rutile phase TiO2 by Czochralski method, etc., and as they are softer (Mohs scale: 5~6) than glasses, they have favorable workability. Moreover, their refractive index distributions are smaller ($1 \times 10^{-4}$ or under). The refractive index distribution is evaluated from 3 σ according to the prism method using a prism of which resolving power is $1 \times 10^{-4}$ or under.

In the case of LiNbO3, as shown in Table 1, when 3~7 mol % of magnesia were added, laser beams of short wavelength such as blue green color caused little index change (optical damage), thus single crystals of LiNbO3 can be favorably used as condenser lenses. In particular, when magnesia in a single crystal of LiNbO3 is 4~5 mol %, the refractive index distribution is almost nil, thus it is very favorable. When magnesia in a single crystal of LiNbO3 is less than 3 mol %, its optical damage resistance is lower.

When the content of magnesia in a single crystal exceeds 7 mol % grown single crystals tend to have many cracks.

The above-mentioned single crystals, of which refractive indexes are greater than those of glasses, of which refractive index distributions are smaller than those of glasses, and which have excellent workability, can be very favorably used for SILs, and they can greatly reduce the beam spot size of a laser beam. As a result, the current recording pit size can be reduced significantly, and recording on an optical recording medium can be made at a density as high as several times of the present level.

TABLE 1

Index change induced in LiNbO3 (sample number: 5)

| MgO added (mol %) | Induced index variation Δn |
|---|---|
| 0.0 | $4.0 \times 10^{-4} \sim 5.0 \times 10^{-4}$ |
| 3.0 | $1.5 \times 10^{-5}$ |
| 4.2 | $1.0 \times 10^{-6} \sim 1.8 \times 10^{-6}$ |
| 5.0 | $1.2 \times 10^{-6}$ |
| 5.2 | $4.0 \times 10^{-6} \sim 8.0 \times 10^{-6}$ |
| 5.5 | $2.2 \times 10^{-6} \sim 2.8 \times 10^{-6}$ |
| 7.0 | $3.0 \times 10^{-6} \sim 5.0 \times 10^{-6}$ |

Embodiment 2

A single crystal of rutile phase TiO2 of about 2 inches in diameter was obtained by Czochralski method using a crystal growth furnace of resistance heating process. Substrates of 1 mm in thickness were cut with a fixed orientation along with the face c from the above-mentioned single crystal of rutile phase TiO2 so that the optic axis (Z axis (c axis)) was perpendicular to the recording side of an optical magnetic disc (the refractive index is 2.61 because the refractive index for ordinary ray and the refractive index for extraordinary ray are identical to each other). Both faces of these substrates were polished and the substrates were bonded together with a wax of low viscosity. Next, the cubes of which one side is 2 mm were cut out of the bonded substrates, and spherical lenses of 1 mm in diameter were produced by a conventional polishing process for optical ball lens. Then these spherical lenses were immersed in a wax removing solution and rinsed to obtain hemispheric lenses of i mm in diameter. The refractive index distribution of the single crystal of rutile phase TiO2 was $1 \times 10^{-5}$ or under.

Next, a laser beam from a semiconductor laser with a wavelength of 529 nm was condensed by an objective lens of an optical head like one shown in FIG. 1, and the beam was focused further by the SIL made of the above-mentioned single crystal. In this way, the distance between the recording side of an optical magnetic disc and the flat part of the hemispheric SIL was narrowed down to about 100 nm which was within ¼ of the wavelength of the laser beam in use, and the recording spot size was measured to be about 180 nm.

A hemispheric SIL made of borosilicate glass having a refractive index of 1.8 was used, and a recording spot size was measured under similar conditions. It was about 260 nm that is a very large spot size in comparison with the above-mentioned embodiment. The refractive index distribution of the glass was $5 \times 10^{-4}$ or over.

Embodiment 3

In a way similar to the embodiment 2, a single crystal of LiNbO3 of about 3 inches in diameter was obtained by Czochralski method using a crystal growth furnace of resistance heating process. Magnesia was added to the raw material for growing a single crystal so that the content of magnesia after crystal growth is 5 mol %.

The light-induced refractive index change of this single crystal of LiNbO3 is measured by Senarmont method. It was about $1.2 \times 10^{-6}$, and the refractive index distribution was $1 \times 10^{-4}$ or under and was very small in comparison with that of the above-mentioned glass. Substrates of 0.75 mm in thickness were cut with a fixed orientation along the face c from the above-mentioned single crystal of LiNbO3 so that the optic axis (Z axis (c axis)) was perpendicular to the recording side of an optical magnetic disc (the refractive index is 2.29 because the refractive index for ordinary ray and the refractive index for extraordinary ray are identical to each other). Both faces of these substrates were polished and the substrates were bonded together with a wax of low viscosity. Next, cubes of which one side is 1.5 mm were cut out of the bonded substrates, and spherical lenses of 0.5 mm in diameter were produced by a conventional polishing process for optical ball lens. Then these spherical lenses were immersed in a wax removing solution and rinsed to obtain hemispheric lenses of 0.5 mm in diameter.

Next, in a way similar to the embodiment 2, a laser beam having a wavelength of 529 nm was condensed by an objective lens, and the beam was focused further by a SIL made of the above-mentioned single crystal. In this way, the distance between the recording side of an optical magnetic disc and the flat part of the hemispheric SIL was narrowed down to about 100 nm, and the recording spot size was measured to be about 205 nm.

Embodiment 4

In a way similar to the embodiment 2, a single crystal of LiTaO3 of about 3 inches in diameter was obtained by Czochralski method using a crystal growth furnace of resistance heating process. Substrates of 0.9 mm in thickness were cut with a fixed orientation along the face c from the above-mentioned single crystal of LiTaO3 so that the optic axis (Z axis (c axis)) was perpendicular to the recording side of an optical magnetic disc (the refractive index is 2.18 because the refractive index for ordinary ray and the refractive index for extraordinary ray are identical to each other). Both faces of these substrates were polished and the substrates were bonded together with a wax of low viscosity. Next, cubes of which one side is 1.8 mm were cut out of the bonded substrates, and spherical lenses of 0.8 mm in diameter were produced by a conventional polishing process for optical ball lens. Then these spherical lenses were immersed in a wax removing solution and rinsed to obtain hemispheric lenses of 1 mm in diameter.

Next, in a way similar to the embodiment 2, a laser beam of a semiconductor laser having a wavelength of 529 nm was condensed by an objective lens, and the beam was focused further by a SIL made of the above-mentioned single crystal. In this way, the distance between the recording side of an optical magnetic disc and the flat part of the hemispheric SIL was narrowed down to about 100 nm, and the recording spot size was measured to be about 210 nm.

Embodiment 5

A single crystal of SrNbO3 of about 2 inches in diameter was obtained by Czochralski method using a crystal growth furnace of radio-frequency heating process. This single crystal of SrNbO3 was cut into wafers of 2 mm thick. Then wafers were cut into 2 mm cubes by a wire saw. Next, 2 mm cubes were worked in to hemispheric lenses of 1 mm in diameter by conventional optical glass polishing processes such as barrel polishing and ball making. The above-mentioned single crystal of SrNbO3 has a refractive index of 2.22, and its refractive index distribution was within $1 \times 10^{-4}$.

An outgoing beam from a semiconductor laser with a wavelength of 635 nm was condensed by an objective lens of an optical head like one shown in FIG. 1, and the beam was focused further by a SIL made of the above-mentioned single crystal. In this way, the distance between the recording side of an optical magnetic disc and the flat part of the hemispheric SIL was narrowed down to about 150 nm which is within ¼ of the wavelength of the laser beam in use, and the recording spot size was measured to be about 190 nm. SILs having high refractive indexes and low refractive index distribution s we re also produced from SrTaO3, CaNbO3, CaTaO3, CaTiO3, KNbO3, KTaO3, K(Ta, Nb)O3, BaZrO3, SrZrO3 and CaZrO 3.

Embodiment 6

In a way similar to the embodiment 5, a single crystal of Bi4Si3O12 about 2 inches in diameter was obtained by Czochralski (CZ) method using a crystal growth furnace of radio-frequency heating process. This single crystal of B4Si3O12 was cut into wafers of 2 mm thick. Then wafers were cut into 2 mm cubes by a wire saw. The 2 mm cubes were worked into hemispheric lenses of 1 mm in diameter by conventional optical glass polishing processes such as barrel polishing and ball making. The above-mentioned single crystal of Bi4Si3O12 had a refractive index of 2.1, and its refractive index distribution was about $1 \times 10^{-5}$.

An outgoing beam from a semiconductor laser with a wavelength of 635 nm was condensed by an objective lens of an optical head like one shown in FIG. 1, and the beam was focused further by a SIL made of the above-mentioned single crystal. In this way, the distance between the recording side of an optical magnetic disc and the flat part of the hemispheric SIL was narrowed down to about 150 nm which is within ¼ of the wavelength of the laser beam in use, and the recording spot size was measured to be about 195 nm.

SILs having high refractive indexes and low refractive index distributions were also produced from ZnWO4, ZnMoO4, CdWO4, CdMoO4, PbWO4, Bi20SiO12, Bi20GeO12, Bi4Si3O12 and Bi4Ge3O12.

Embodiment 7

In a way similar to the embodiment 5, a single crystal of GaP of about 2 inches in diameter was obtained by CZ method, and it was cut into wafers with 2 mm thick. Then wafers were cut into 2 mm cubes by, for example, a wire saw. The 2 mm cubes were worked into hemispheric lenses of 1 mm in diameter by conventional optical glass polishing processes such as barrel polishing and ball making. The above-mentioned single crystal of GaP had a refractive index of 3.3, and its refractive index distribution was about $1 \times 10^{-5}$.

Next, an outgoing beam from a semiconductor laser with a wavelength of 635 nm was condensed by an objective lens of an optical head like one shown in FIG. 1, and the beam was focused further by a SIL made of the above-mentioned single crystal. In this way, the distance between the recording side of an optical magnetic disc and the flat part of the hemispheric SIL was narrowed down to about 150 nm which was within ¼ of the wavelength of the laser beam in use, and the recording spot size was measured to be about 170 nm. SILs having high refractive indexes and low refractive index distributions were also produced from single crystals of ZnTe, ZnSe, Cu3TaSe4 and ZnS.

We claim:

1. An optical system for optical recording having a condenser lens for irradiating a laser beam on an optical recording medium, said condenser lens comprising a single crystal of any one of the group consisting of LiNbO3, LiTaO3, rutile phase TiO2, PbMoO4, TeO2, SrTiO3, ZrO2, SrNbO3, SrTaO3, CaNbO3, CaTaO3, CaTiO3, KNbO3, KTaO3, K(Ta, Nb)O3, BaZrO3, SrZrO3, CaZrO3, ZnWO4, ZnMoO4, CdWO4, CdMoO4, PbWO4, Bi20SiO12, Bi20GeO12, Bi4 Si3 O12, Bi4Ge3O12, GaP, ZnTe, ZnSe, Cu3TaSe4 and ZnS.

2. An optical system for optical recording of claim 1 characterized in that said condenser lens is made of a single crystal of LiNbO3 containing 3~7 mol % of magnesia.

3. An optical system for optical recording having a condenser lens to irradiate a laser beam on an optical recording medium, said condenser lens being made of a single crystal having a refractive index of 2.0 or over and optical anisotropy.

4. An optical system for optical recording of claim 3 characterized in that the axis of incident beam and the crystallographic optic axis of said single crystal are set substantially at an angle of 0°.

5. An optical system for optical recording of claim 3 characterized in that the axis of incident beam and the crystallographic optic axis of said single crystal are set substantially at an angle of 45°.

* * * * *